United States Patent
Dumur et al.

(10) Patent No.: US 11,485,485 B2
(45) Date of Patent: Nov. 1, 2022

(54) METHOD FOR STOPPING AN ENGINE IN OVERSPEED, AND ASSOCIATED SYSTEM AND ROTORCRAFT

(71) Applicant: AIRBUS HELICOPTERS, Marignane (FR)

(72) Inventors: Guillaume Dumur, Salon de Provence (FR); Francois-Xavier Gaulmin, Salon de Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/230,054

(22) Filed: Apr. 14, 2021

(65) Prior Publication Data
US 2021/0394892 A1    Dec. 23, 2021

(30) Foreign Application Priority Data

Jun. 17, 2020  (FR) ...................................... 2006318

(51) Int. Cl.
    *B64C 27/00*   (2006.01)
    *F01D 21/02*   (2006.01)
    *B64C 19/00*   (2006.01)

(52) U.S. Cl.
    CPC ............ *B64C 27/006* (2013.01); *B64C 19/00* (2013.01)

(58) Field of Classification Search
    CPC . B64C 27/006; B64C 19/00; F05D 2270/021; F01D 21/02
    See application file for complete search history.

(56) References Cited

U.S. PATENT DOCUMENTS

| 6,321,525 | B1  | 11/2001 | Rogers |
| 6,729,138 | B2* | 5/2004  | Noussitou ............. B64D 31/06 60/773 |

(Continued)

FOREIGN PATENT DOCUMENTS

| EP | 3000986 A1 | 3/2016 |
| EP | 3075662 A1 | 10/2016 |

(Continued)

OTHER PUBLICATIONS

French Search Report for French Application No. FR2006318, Completed by the French Patent Office, Dated Feb. 4, 2021, 9 pages.

*Primary Examiner* — Brian M O'Hara
(74) *Attorney, Agent, or Firm* — Brooks Kushman P.C.

(57) ABSTRACT

A method for stopping an engine of a rotorcraft in overspeed, the rotorcraft comprising at least one engine, the engine comprising a gas generator and a power assembly, the power assembly comprising at least one power turbine rotated by gases originating from the gas generator, the power assembly comprising at least one power shaft rotationally secured to the power turbine, the power assembly rotating about a longitudinal axis at a speed referred to as the "speed of rotation". The method comprises steps consisting in measuring a current value of the speed of rotation, determining a time derivative of the current value of the speed of rotation, referred to as the "current derivative $$\left(\frac{dN2i}{dt}\right)",$$

and automatically stopping the engine when the current derivative (Continued)

$$\left(\frac{dN2i}{dt}\right)$$

changes sign.

20 Claims, 3 Drawing Sheets

(56) References Cited

U.S. PATENT DOCUMENTS

| | | | | |
|---|---|---|---|---|
| 10,150,569 | B2* | 12/2018 | Certain | F02C 3/10 |
| 11,198,505 | B2* | 12/2021 | Thiriet | B64C 27/006 |
| 2012/0116613 | A1 | 5/2012 | Daumas | |
| 2013/0098042 | A1 | 4/2013 | Frealle et al. | |
| 2013/0247577 | A1 | 9/2013 | Rossotto et al. | |
| 2016/0090187 | A1 | 3/2016 | Certain | |
| 2016/0090918 | A1 | 3/2016 | Certain | |
| 2016/0311547 | A1 | 10/2016 | Rossoto et al. | |
| 2020/0277072 | A1* | 9/2020 | Zoppitelli | B64D 31/12 |
| 2021/0394892 | A1* | 12/2021 | Dumur | B64C 27/006 |

FOREIGN PATENT DOCUMENTS

| | | |
|---|---|---|
| FR | 2962165 A1 | 1/2012 |
| FR | 2967213 A1 | 5/2012 |
| FR | 2980174 A1 | 3/2013 |
| FR | 3026438 A1 | 4/2016 |
| JP | 2004011459 A | 1/2004 |

* cited by examiner

METHOD FOR STOPPING AN ENGINE IN OVERSPEED, AND ASSOCIATED SYSTEM AND ROTORCRAFT

CROSS REFERENCE TO RELATED APPLICATIONS

This application claims priority to French patent application No. FR 20 06318 filed on Jun. 17, 2020, the disclosure of which is incorporated in its entirety by reference herein.

TECHNICAL FIELD

The present disclosure relates to a method for stopping an engine in overspeed, to such an overspeed safety system and to a rotorcraft provided with this overspeed safety system.

The disclosure relates to the general technical field of systems ensuring the operating safety of the engines of an aircraft and, in particular, the operating safety of a turboshaft engine of a rotorcraft.

The present disclosure relates more particularly to protection for a power plant in the event of overspeed of an engine.

BACKGROUND

A rotorcraft has at least one engine for rotating at least one rotor. Such a rotor provides at least partial lift for this rotorcraft, and even its propulsion. For example, a twin-engine rotorcraft comprises a first engine and a second engine that jointly drive a main lift and/or propulsion rotor via a power transmission system.

The first engine and the second engine are generally controlled respectively by a first control unit and a second control unit. Such control units may be part of a more general control system referred to as a "Full Authority Digital Engine Control" or its acronym "FADEC".

Each control unit may comprise a computer and peripheral command and control units interfacing between the cockpit and the associated engine of the rotorcraft.

In addition, the engines of such a rotorcraft may be turboshaft engines.

A turboshaft engine conventionally comprises a gas generator. The gas generator comprises successively at least one compressor, a combustion chamber and at least one expansion turbine, the compressor being mechanically connected to the expansion turbine by a drive shaft.

In addition, the turboshaft engine includes a power assembly located downstream of the gas generator. This power assembly is generally provided with at least one power turbine rotated by the gases exiting the gas generator. This power turbine rotates a working shaft which meshes with the power transmission system that is connected to at least one lift and/or propulsion rotor.

The power turbine is described as "free" when this turbine is not mechanically connected to the gas generator by a shaft.

In the event of breakage of the power transmission system or slippage of a free-wheel of this transmission system in particular, the speed of rotation of the power turbine of a turboshaft engine can increase considerably and extremely rapidly. Above a certain threshold, a person skilled in the art considers that such a turboshaft engine is in overspeed, such overspeed possibly leading to rotation speed runaway until the engine is damaged or the engine even explodes.

For this reason, rotorcraft are generally equipped with safety systems to attempt to limit the impact of such overspeed on the integrity of a rotorcraft.

Therefore, an electronic shut-down system can be implemented to stop the turboshaft engines in order to prevent overspeed from occurring.

The manufacturer of a turboshaft engine therefore establishes, for example, a rotation speed threshold for the free turbine of this turboshaft engine. When this threshold is reached, the control unit stops the engine. In this configuration, the engine is not damaged by the safety system.

Document FR 2 962 165 suggests comparing only the engine torque transmitted by a free turbine with a torque threshold.

However, using a single speed or torque monitoring threshold may result in untimely engine shutdowns, for example when the rotorcraft is performing a sharp maneuver. Consequently, this monitoring system is sometimes not provided on a single-engine aircraft.

On a twin-engine rotorcraft, the shutdown of one engine can be inhibited in the event of a shutdown of the other engine due to overspeed, in order to prevent the untimely shutdown of both engines. After a first engine has been shut down, the second engine is no longer allowed to stop during flight.

In such a scenario, however, the second engine cannot be stopped in the event of overspeed. Such a situation is unlikely but nevertheless possible. Consequently, if the second engine subsequently reaches an overspeed condition, this second engine cannot be stopped automatically because its protection is inhibited. The second engine is therefore in danger of being in an overspeed situation. In addition, in such a scenario, provision has been made to protect the immediate external environment of this engine with a mechanical protection surrounding the engine, formed by a retaining ring arranged around the free turbine. Protection of this type is generally known and referred to as "blade shedding".

In one variant, a pilot can then manually reset an electronic system for protecting the second engine against overspeed in order to avoid such a situation.

The technological background also includes a protection device which stops an engine in overspeed subject to a comparison between the mechanical power required by the rotorcraft and a predefined power threshold. The mechanical power required by the rotorcraft is calculated according to at least the current or anticipated value of the resistive torque of a main rotor of the rotorcraft.

Document FR 2 967 213 describes a control method for controlling an overspeed safety system of an aircraft comprising at least two engines. This method consists in setting the engine overspeed safety system, monitoring the rotational speed of the engines, detecting overspeed in one of the engines, shutting down the engine in question in the event of such detection, and inhibiting the operation of the overspeed safety system for the other engine(s) that remain in operation. The overspeed safety systems of the engines that remain in operation may be reset according to one or more safety parameters.

Document FR 2 980 174 describes a control method for controlling an overspeed safety system of an aircraft comprising at least two engines. According to this method, a first engine is shut down when a monitoring parameter of this first engine exceeds a first threshold and a second engine separate from this first engine is shut down when the monitoring parameter of this second engine exceeds a second threshold, the second threshold being higher than the first threshold.

In particular, the monitoring parameter is the speed of rotation of the free turbine of an engine.

Document FR 3 026 438 describes a control method for controlling an overspeed safety system of a rotorcraft having at least one engine. According to this method, the engine is shut down when a time derivative of the speed of rotation reached by a power assembly of the engine exceeds a limit derivative.

Document JP 2004 011459 relates to the technical field of ships moving at high speed and to their prime mover comprising a gas turbine. Furthermore, this document describes protecting a gas turbine against overspeed by measuring a speed of rotation N of an output shaft by means of a speed sensor.

A speed controller then receives information representative of the speed N and can control a valve to shut off a fuel supply to the gas turbine if overspeed is detected.

This overspeed detection is achieved by comparing the derivative of the speed of rotation dN/dt with a positive threshold value.

Document EP 3 000 986 A1 describes overspeed detection carried out as a function of a measured torque, a speed of rotation N1 of the gas generator and a speed of rotation N2 of the power assembly.

Document EP 3 075 662 A1 describes a method for stopping an engine in nominal operation and therefore does not allow the occurrence of overspeed to be detected.

Document U.S. Pat. No. 6,321,525 B1 discloses overspeed detection carried out as a function of a speed of rotation of the gas turbine. The aim of the present disclosure is therefore to propose an alternative method for limiting the risks of an untimely shutdown of a rotorcraft engine and for ensuring engine shutdown in the event of a hard landing of a rotorcraft on the ground, on a vehicle such as, in particular, a boat, on a building or on any landing strip in general. Indeed, such a hard landing can anticipate overspeed of at least one engine fitted to the rotorcraft.

Hereinafter, for the sake of simplicity, the term "ground" may be used to refer indiscriminately to dry land, the deck of a ship, a helipad arranged, for example, on a building, or any other terrain or runway on which the rotorcraft is suitable for landing.

SUMMARY

The disclosure therefore relates to a method for stopping a rotorcraft engine in overspeed, the rotorcraft comprising at least one engine, the engine comprising a gas generator and a power assembly, the power assembly comprising at least one power turbine rotated by gases originating from the gas generator, the power assembly comprising at least one power shaft rotationally secured to the power turbine, the power assembly rotating about a longitudinal axis AX at a speed referred to as the "speed of rotation N2".

According to the disclosure, such a method is remarkable in that, during a flight, the method comprises steps consisting in:

measuring a current value N2i of the speed of rotation N2 reached by the power assembly during a predetermined time period T;

determining a time derivative of the current value N2i of the speed of rotation referred to as the "current derivative"

$$\left(\frac{dN2i}{dt}\right);$$

and automatically stopping the engine when the current derivative $$\left(\frac{dN2i}{dt}\right)$$

changes sign over the predetermined time period T from a strictly negative value to a strictly positive value.

In other words, the method for stopping a rotorcraft engine in overspeed makes it possible to detect and anticipate the occurrence of overspeed in a power shaft of at least one engine of the rotorcraft.

Indeed, during a hard landing of a rotorcraft on the ground, an impact may occur between at least one blade of a main rotor contributing at least to lift, and the ground or any other support, vehicle or object. Consequently, such an impact will then cause the current value N2i of the speed of rotation N2 reached by the power assembly to vary very sharply and very rapidly.

The method according to the disclosure then makes it possible to automatically stop the engine when the current value N2i slows down because of the impact of a blade with the ground and then accelerates over the predetermined time period T. In this case, the stopping of the engine(s) is controlled when the current derivative $$\left(\frac{dN2i}{dt}\right)$$

is detected to change from a strictly negative value to a strictly positive value. More precisely, the current derivative $$\left(\frac{dN2i}{dt}\right)$$

is a first-order derivative and changes from a strongly negative value to a strongly positive value during a hard landing of the rotorcraft on the ground.

In addition, the stopping step for automatically stopping the engine may be implemented, for example, by cutting off a fuel supply to the gas generator. The amount of fuel injected into the engine can be reduced or even cancelled.

Such a method thus makes it possible to identify a hard landing of a rotorcraft and to control the automatic stopping of the engine in overspeed but to not control the stopping of the engine in other overspeed scenarios where only the speed of rotation of the engine exceeds a threshold value.

This method therefore differs from the methods for controlling the automatic stopping of the engine during flight. For example, during flight, if the mechanical connection between the power unit and the gearbox is faulty, engine overspeed may occur. The current derivative $$\left(\frac{dN2i}{dt}\right)$$

then becomes very strongly positive. However, it has not been strongly negative prior to this very strongly positive value, and the method according to the disclosure therefore makes it possible to avoid controlling the untimely stopping of an engine during flight.

In practice, the stopping step can be implemented when the current derivative $$\left(\frac{dN2i}{dt}\right)$$

is less than or equal to a first predetermined threshold value S1 during a first intermediate time period T1, and the current derivative $$\left(\frac{dN2i}{dt}\right)$$

is then greater than or equal to a second predetermined threshold value S2 during a second intermediate time period T2.

In other words, such a method makes it possible to control the stopping of the engine(s) by verifying that the current derivative $$\left(\frac{dN2i}{dt}\right)$$

changes sign and by comparing the current derivative $$\left(\frac{dN2i}{dt}\right)$$

with the first and second predetermined threshold values S1 and S2. Such a comparison can also be implemented constantly during the flight of a rotorcraft or alternatively during a landing phase or indeed depending on the height of the rotorcraft from the ground or any landing zone in general.

Furthermore, the predetermined time period T is thus broken down into two successive time periods, the first intermediate time period T1 and then the second intermediate time period T2.

Such first and second predetermined threshold values S1 and S2 and first and second intermediate time periods T1 and T2 can be defined in different ways and, in particular, by computer simulations, by flight tests and by trials. The first and second predetermined threshold values S1 and S2 and the first and second intermediate time periods T1 and T2 are also specific to each rotorcraft and, for the same rotorcraft, can vary as a function of different parameters linked, for example, to the type of mission of the rotorcraft and/or to its mass.

Furthermore, these first and second predetermined threshold values S1 and S2 and first and second intermediate time periods T1 and T2 may be constant values stored in a memory on board the rotorcraft.

Alternatively, the first and second predetermined threshold values S1 and S2 and the first and second intermediate time periods T1 and T2 can also be determined during flight and vary over time according to predetermined calculation laws and recorded in a memory on board the rotorcraft.

According to a particular example of the disclosure, the current derivative $$\left(\frac{dN2i}{dt}\right)$$

being expressed as a percentage of the current value N2i per second (% N2i·s$^{-1}$), the first predetermined threshold value S1 may be between −50% N2i·s$^{-1}$ and −100% N2i·s$^{-1}$.

Indeed, such a range of values of the first predetermined threshold value S1 makes it possible to identify a deceleration of the current value N2i caused by at least one main rotor blade impacting with the ground.

According to another aspect of the disclosure, the current derivative $$\left(\frac{dN2i}{dt}\right)$$

being expressed as a percentage of the current value N2i per second (% N2i·s$^{-1}$), the second predetermined threshold value S2 may be between +50% N2i·s$^{-1}$ and +200% N2i·s$^{-1}$.

This other range of values of the second predetermined threshold value S makes it possible to identify an acceleration of the current value N2i representative, for example, of the blade or blades breaking and/or of a connecting shaft breaking between the engine and a main gearbox. Indeed, the blades impacting with the ground during a hard landing may also cause other transmission elements to break between the power turbine of the engine and dynamic assemblies of the rotorcraft.

Advantageously, the first intermediate time period T1 may be less than 1 second and may preferably be between 100 milliseconds and 800 milliseconds.

As with the range of values of the first predetermined threshold value S1, this range of values for the first intermediate time period T1 also helps identify the deceleration of the current value N2i caused by at least one blade impacting with the ground.

In practice, the second intermediate time period T2 may be less than 1 second and may preferably be between 100 milliseconds and 800 milliseconds.

Similarly, this range of values for the second intermediate time period T2 helps identify an acceleration of the current value N2i representative, for example, of the blade or blades breaking and/or of a connecting shaft breaking between the engine and a main gearbox.

Optionally and additionally, the stopping of the engine may be conditioned by other factors that help ensure that the engine of the rotorcraft is indeed in a phase preceding a risk of overspeed.

According to a first embodiment of the disclosure, the gas generator comprising a rotating assembly that rotates about the longitudinal axis AX at a speed referred to as the "speed of rotation N1", the method may comprise a step consisting in measuring a current value N1i of the speed of rotation N1 reached by the gas generator.

In this case, the stopping step may be conditioned by a current value N1i of the speed of rotation N1 greater than a third predetermined threshold value S3.

Such a third predetermined threshold value S3 thus makes it possible to ensure that the engine is indeed operating in a phase in which the gas generator is supplying gases making it possible to rotate the free turbine. This makes it possible to avoid false detection of a risk of overspeed caused, for example, by an autorotation flight phase. Indeed, during such an autorotation flight phase, the current derivative $$\left(\frac{dN2i}{dt}\right)$$

may vary greatly even though the engine is providing very little power to the dynamic assemblies of the rotorcraft.

According to a second embodiment of the disclosure, the method may include a step consisting in measuring a current value Tqi of an engine torque Tq transmitted to the power shaft(s).

In this case, the stopping step may be conditioned by a current value Tqi of the engine torque Tq higher than a fourth predetermined threshold value S4.

According to this second example, the fourth predetermined threshold value S4 also makes it possible to ensure that the engine is operating in a phase in which the gas generator is supplying gases making it possible to rotate the free turbine. As previously, the intention is to then avoid identifying a risk of overspeed caused, for example, by an autorotation flight phase.

Advantageously, the method may include a step for processing the current derivative $$\left(\frac{dN2i}{dt}\right),$$

the processing step making it possible to filter the current derivative $$\left(\frac{dN2i}{dt}\right)$$

and/or to calculate an average value of the current derivative $$\left(\frac{dN2i}{dt}\right).$$

Such a processing step thus helps make the filtered or averaged value of the current derivative $$\left(\frac{dN2i}{dt}\right)$$

more robust against digital sampling phenomena.

The object of the present disclosure is also an overspeed safety system for a rotorcraft engine, the engine comprising a gas generator and a power assembly, the power assembly comprising at least one power turbine rotated by gases originating from the gas generator, the power assembly comprising at least one power shaft rotationally secured to the power turbine, the power assembly rotating about a longitudinal axis AX at a speed referred to as the "speed of rotation N2", the overspeed safety system comprising:

a speed sensor for measuring a current value N2i of said speed of rotation N2 reached by the power assembly during a predetermined time period T;

a shutdown system for stopping operation of the engine; and a processing unit connected to both the speed sensor and the shutdown system.

According to the disclosure, such a processing unit is remarkable in that it is configured to implement the aforementioned method by determining a time derivative of the current value N2i of the speed of rotation referred to as the "current derivative"

$$\left(\frac{dN2i}{dt}\right)$$

and by automatically stopping the engine when the current derivative $$\left(\frac{dN2i}{dt}\right)$$

changes sign over the predetermined time period T from a strictly negative value to a strictly positive value.

The speed sensor may comprise, for example, an electromagnetic sensor positioned opposite a phonic wheel rotationally secured to the rotary member whose speed of rotation is to be measured.

Conventionally, a phonic wheel may be provided with a peripheral zone comprising teeth distributed circumferentially. As the teeth of the phonic wheel pass in front of the electromagnetic sensor, they modify the magnetic field produced and induce an alternating current in a coil of the electromagnetic sensor, the frequency of which is proportional to the speed of rotation.

The shut-down system may also include a fuel metering valve that delivers fuel to the gas generator. The shut-down system can then, for example, minimize or even cancel the amount of fuel injected into the engine by the fuel metering valve.

This shut-down system may also include at least one pump that delivers fuel to the gas generator. In this case, the shut-down system can stop the engine, for example by cutting off the power supply to the fuel pump.

Furthermore, the processing unit may comprise a logic circuit or equivalent, or indeed a computing means such as a processor or equivalent that executes instructions stored in a memory.

In particular, the processing unit may be a FADEC of the engine. To reiterate, a FADEC is the control unit of a turboshaft engine, the acronym standing for "Full Authority Digital Engine Control".

Alternatively, the processing unit may also be arranged in parallel with the FADEC in order to enable an engine in overspeed to be shut down even in the event of a FADEC failing.

In addition to an overspeed safety system, the disclosure also relates to a rotorcraft comprising such a system.

Such a rotorcraft comprises at least one engine and an overspeed safety system for this or these engine(s).

According to the disclosure, such a rotorcraft is remarkable in that the overspeed safety system is as described above.

BRIEF DESCRIPTION OF THE DRAWINGS

The disclosure and its advantages appear in greater detail from the following description of examples given by way of illustration with reference to the accompanying figures, in which.

Figure 4:
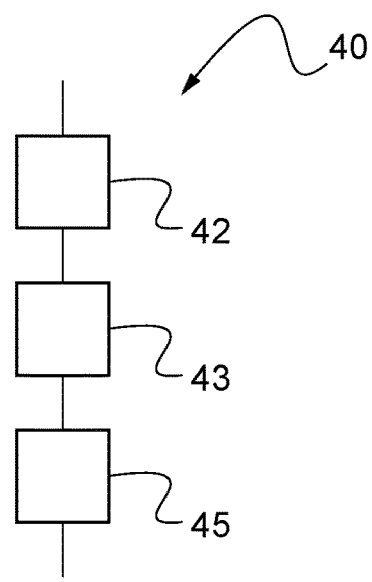
Figure 5:
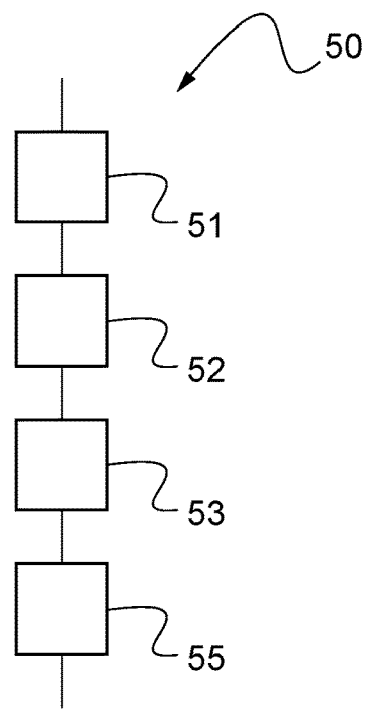
Figure 6:
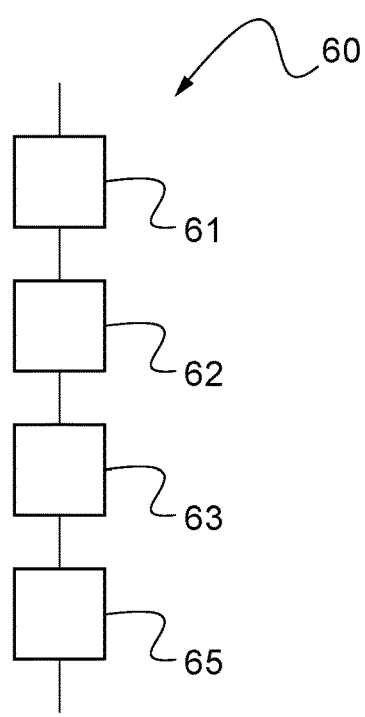
Figure 7:
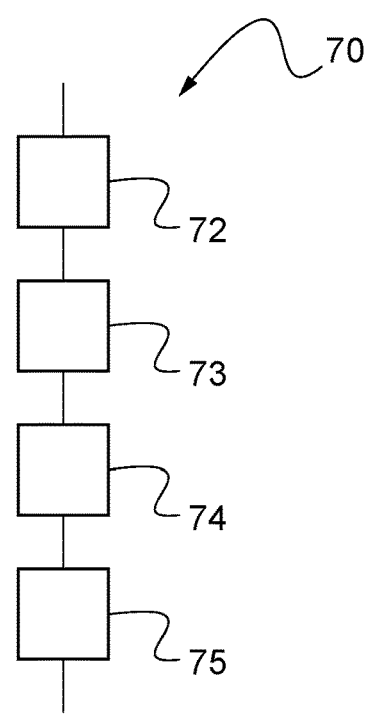

as a function of time, according to the disclosure;

FIG. 4 is a first logic diagram showing a first variant of the method for stopping a rotorcraft engine in overspeed, according to the disclosure;

FIG. 5 is a second logic diagram showing a second variant of the method for stopping a rotorcraft engine in overspeed, according to the disclosure;

FIG. 6 is a third logic diagram showing a third variant of the method for stopping a rotorcraft engine in overspeed, according to the disclosure; and FIG. 7 is a fourth logic diagram showing a fourth variant of the method for stopping a rotorcraft engine in overspeed, according to the disclosure.

DETAILED DESCRIPTION

Elements present in more than one of the figures are given the same references in each of them.

As mentioned above, the disclosure relates to a method for stopping a rotorcraft engine, to an overspeed safety system and to a rotorcraft thus equipped.

Figure 1:
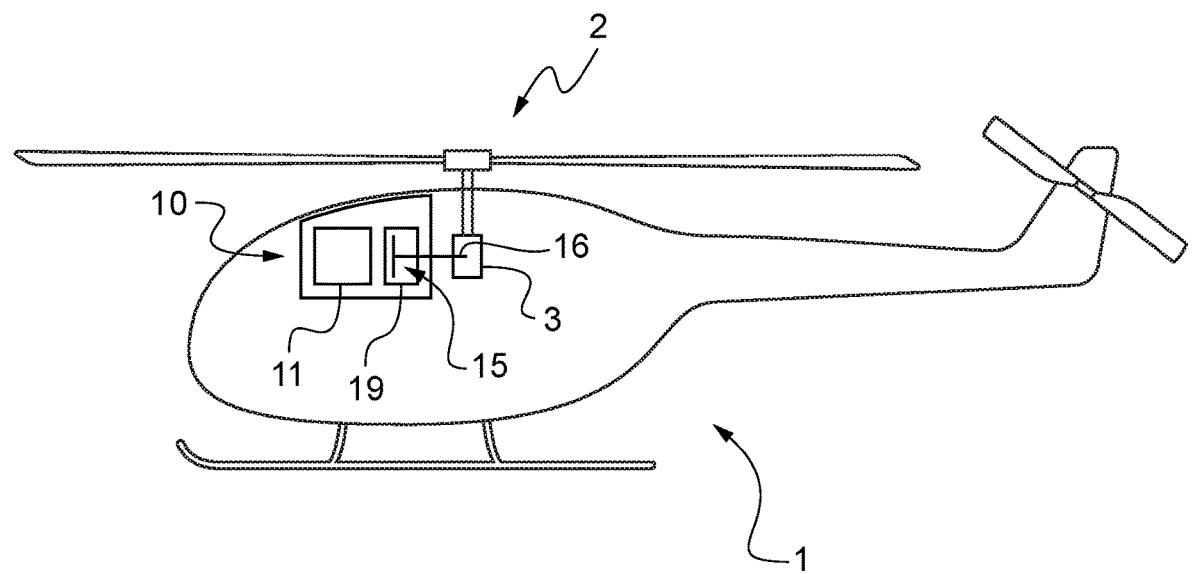
FIG. 1 is a side view of a rotorcraft according to the disclosure.

As shown in FIG. 1, such a rotorcraft 1 comprises at least one engine 10 rotating at least one rotor 2 contributing at least to the lift of the rotorcraft 1 in the air. In addition, the engine(s) 10 are connected to a power transmission system 3.

Such an engine 10 may conventionally be a turboshaft engine and comprise a gas generator 11 and a power assembly 19.

Figure 2:
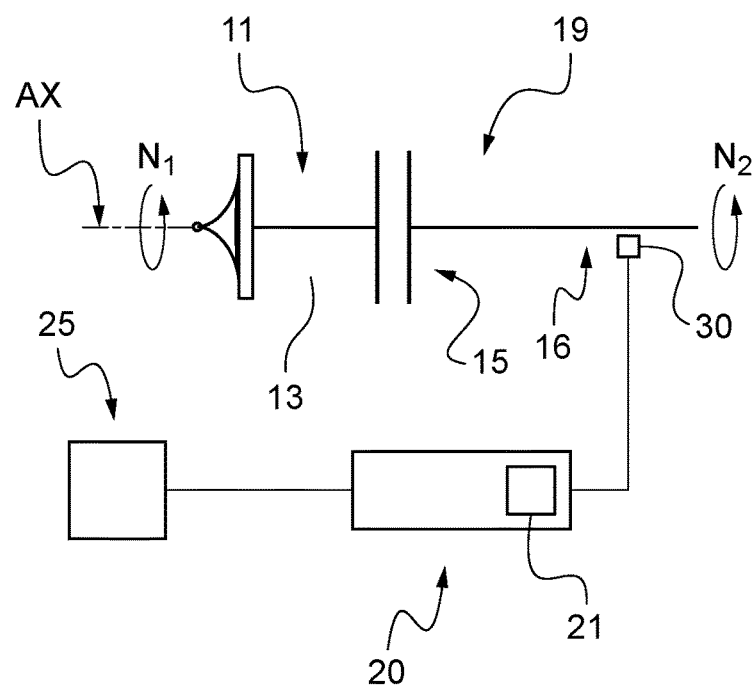
FIG. 2 is a schematic diagram showing an overspeed safety system according to the disclosure.

As shown in FIG. 2, the power assembly 19 comprises at least one power turbine 15 rotated by gases originating from the gas generator 11 and at least one power shaft 16 rotationally secured to the power turbine 15.

A rotating assembly 13 of the gas generator 11 may in particular comprise a compressor and an expansion turbine having a degree of rotational mobility about a longitudinal axis AX and rotating on themselves at a speed referred to as the "speed of rotation N1" relative to a casing of the gas generator 11.

Similarly, the power assembly 19 may also have a degree of rotational mobility about a longitudinal axis AX relative to a chassis and rotate on itself at a speed referred to as the "speed of rotation N2".

In addition, the rotorcraft 1 may be equipped with an overspeed safety system 20. This overspeed safety system 20 comprises a speed sensor 30 for measuring a current value N2i of the speed of rotation N2 reached by the power assembly 19 during a predetermined time period T.

Such a speed sensor 30 may comprise, for example, an electromagnetic sensor positioned opposite a phonic wheel rotationally secured to the power shaft 16.

Such a phonic wheel may comprise teeth arranged at a peripheral zone, these teeth being distributed circumferentially at regular intervals. As the teeth of the phonic wheel pass in front of the speed sensor 30, they may in particular modify a magnetic field and generate an alternating current in a coil of the speed sensor 30, the frequency of which is proportional to the speed of rotation of the power shaft 16.

The overspeed safety system 20 also comprises a shut-down system 25 for stopping operation of the engine 10 when detection conditions are fulfilled.

Such a shut-down system 25 may include a fuel metering valve that delivers fuel to the gas generator 11.

This shut-down system 25 may also include at least one pump that delivers fuel to the gas generator 11.

The overspeed safety system 20 also comprises a processing unit 21 connected by wired or wireless means both to the speed sensor 30 and to the shut-down system 25.

This processing unit 21 may, for example, comprise at least one processor and at least one memory, at least one integrated circuit, at least one programmable system, or at least one logic circuit, these examples not limiting the scope given to the expression "processing unit". The term "processor" may refer equally to a central processing unit or CPU, a graphics processing unit or GPU, a digital signal processor or DSP, a microcontroller, etc.

The processing unit 21 makes it possible to calculate a derivative of the current value N2i of the speed of rotation N2 referred to as the "current derivative"

$$\left(\frac{dN2i}{dt}\right)$$

during a predetermined time period T.

Figure 3:
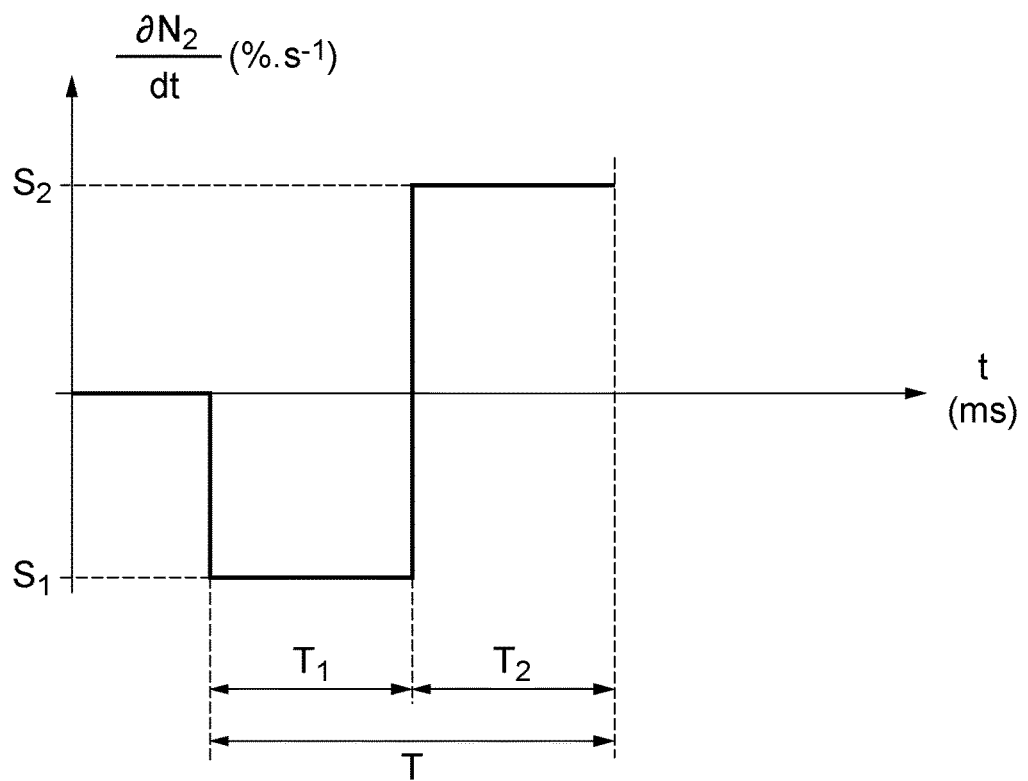
FIG. 3 is a diagram showing the variations of a current derivative $$\left(\frac{dN2i}{dt}\right)$$

As shown in FIG. 3, the current derived values $$\left(\frac{dN2i}{dt}\right)$$

can vary as a function of time and, for example, oscillate around a zero value.

The processing unit 21 then compares the current derivative $$\left(\frac{dN2i}{dt}\right)$$

with first and second predetermined threshold values S1 and S2. Such first and second predetermined threshold values S1 and S2 can be defined in different ways and, in particular, by computer simulations, by flight tests and/or by trials. The first and second predetermined threshold values S1 and S2 and the first and second intermediate time periods T1 and T2 are also specific to each rotorcraft and, for the same rotorcraft, can vary as a function of different parameters linked, for example, to the type of mission of the rotorcraft and/or its mass.

Furthermore, these first and second predetermined threshold values S1 and S2 and first and second intermediate time periods T1 and T2 may be constant values stored in a memory on board the rotorcraft.

Alternatively, the first and second predetermined threshold values S1 and S2 and the first and second intermediate time periods T1 and T2 can also be determined during flight and vary over time according to predetermined calculation laws stored in a memory on board the rotorcraft.

The shut-down system 25 controls the stopping of the engine(s) 10 when the current derivative $$\left(\frac{dN2i}{dt}\right)$$

changes sign over the predetermined time period T from a strictly negative value to a strictly positive value.

In practice, the shut-down system 25 can stop the engine(s) 10 when the current derivative $$\left(\frac{dN2i}{dt}\right)$$

is less than or equal to a first predetermined threshold value S1 during a first intermediate time period T1, and the current derivative $$\left(\frac{dN2i}{dt}\right)$$

is then greater than or equal to a second predetermined threshold value S2 during a second intermediate time period T2.

For example, the first predetermined threshold value S1 is between $-50\%$ $N2i \cdot s^{-1}$ and $-100\%$ $N2i \cdot s^{-1}$ and the second predetermined threshold value S2 is between $+50\%$ $N2i \cdot s^{-1}$ and $+200\%$ $N2i \cdot s^{-1}$.

The first intermediate time period T1 and the second intermediate time period T2 are respectively less than 1 second and are preferably between 100 milliseconds and 800 milliseconds. Added together, the first intermediate time period T1 and the second intermediate time period T2 are equal to the predetermined time period T.

As shown in FIGS. 4 to 7, the disclosure also relates to a method for stopping an engine 10 of a rotorcraft 1 in overspeed.

Thus, as shown in FIG. 4, a first variant of the method for stopping an engine 10 of a rotorcraft 1 in overspeed comprises a measurement step 42 for measuring the current value N2i of the speed of rotation N2 reached by the power assembly 19 during the predetermined time period T.

The method 40 then includes a determination step 43 for determining the current derivative $$\left(\frac{dN2i}{dt}\right).$$

Finally, the method 40 implements a stopping step 45 for automatically stopping the engine 10 when the current derivative $$\left(\frac{dN2i}{dt}\right)$$

changes sign over the predetermined time period T from a strictly negative value to a strictly positive value.

According to a second variant of the method 50 shown in FIG. 5, the stopping of the engine 10 may be conditioned by at least one other parameter. Thus, the method 50 may comprise a step of measuring a current value N1i of the speed of rotation N1 reached by the gas generator 11.

The method 50 then implements a measurement step 52 for measuring the current value N2i of the speed of rotation N2 reached by the power assembly 19 during the predetermined time period T, a step 53 for determining the current derivative $$\left(\frac{dN2i}{dt}\right)$$

and a stopping step 55 for automatically stopping the engine 10.

According to this second variant of the method 50, the stopping step 55 makes it possible to automatically stop the engine when the current value N1i of the speed of rotation N1 is greater than a third predetermined threshold value S3, and the current derivative $$\left(\frac{dN2i}{dt}\right)$$

then changes sign over the predetermined time period T from a strictly negative value to a strictly positive value.

According to a third variant of the method 60 shown in FIG. 6, a measurement step 61 may alternatively be implemented to measure a current value Tqi of an engine torque Tq transmitted to the power shaft 16.

As in the two preceding variants, the method 60 then implements a measurement step 62 for measuring the current value N2i of the speed of rotation N2 reached by the power assembly 19 during the predetermined time period T, a step 63 for determining the current derivative $$\left(\frac{dN2i}{dt}\right)$$

and a stopping step 65 for automatically stopping the engine 10.

According to this third variant of the method 60, the stopping step 65 then makes it possible to automatically stop the engine 10 when the current value Tqi of the engine torque Tq is greater than a fourth predetermined threshold value S4, and the current derivative $$\left(\frac{dN2i}{dt}\right)$$

then changes sign over the predetermined time period T by passing from a strictly negative value to a strictly positive value.

According to a fourth variant of the method 70 shown in FIG. 7, the method implements a measurement step 72 for measuring the current value N2i of the speed of rotation N2 reached by the power assembly 19 during the predetermined time period T, a step 73 for determining the current derivative $$\left(\frac{dN2i}{dt}\right),$$

a step 74 for processing this current derivative $$\left(\frac{dN2i}{dt}\right)$$

in order to filter the current derivative $$\left(\frac{dN2i}{dt}\right)$$

and/or calculate an average value of the current derivative $$\left(\frac{dN2i}{dt}\right),$$

and a stopping step 75 for automatically stopping the engine 10.

This stopping step 75 makes it possible to automatically stop the engine 10 when the filtered and/or averaged current derivative $$\left(\frac{dN2i}{dt}\right)$$

changes sign over the predetermined time period T from a strictly negative value to a strictly positive value.

Naturally, in addition to a change of sign, the filtered and/or averaged current derivative $$\left(\frac{dN2i}{dt}\right)$$

can be used to stop the engine(s) 10 when this filtered and/or averaged current derivative $$\left(\frac{dN2i}{dt}\right)$$

is less than or equal to the first predetermined threshold value S1 during a first intermediate time period T1, and this filtered and/or averaged current derivative $$\left(\frac{dN2i}{dt}\right)$$

is then greater than or equal to a second predetermined threshold value S2 during a second intermediate time period T2.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

What is claimed is:

1. A method for stopping an engine of a rotorcraft in overspeed, the rotorcraft comprising at least one engine, the engine comprising a gas generator and a power assembly, the power assembly comprising at least one power turbine rotated by gases originating from the gas generator, the power assembly comprising at least one power shaft rotationally secured to the power turbine, the power assembly rotating about a longitudinal axis at a speed of rotation (N2);
wherein, during a flight, the method comprises:
measuring a current value (N2i) of the speed of rotation reached by the power assembly during a predetermined time period (T);
determining a current derivative $$\left(\frac{dN2i}{dt}\right)$$

by determining a time derivative of the current value of the speed of rotation; and
automatically stopping the engine when the current derivative $$\left(\frac{dN2i}{dt}\right)$$

changes sign over the predetermined time period (T) from a strictly negative value to a strictly positive value.

2. The method according to claim 1
wherein the stopping step is implemented when the current derivative $$\left(\frac{dN2i}{dt}\right)$$

is less than or equal to a first predetermined threshold value (S1) during a first intermediate time period (T1) and the current derivative $$\left(\frac{dN2i}{dt}\right)$$

is then greater than or equal to a second predetermined threshold value (S2) during a second intermediate time period (T2).

3. The method according to claim 2
wherein the current derivative $$\left(\frac{dN2i}{dt}\right)$$

being expressed as a percentage of the current value N2i per second (% N2i·s$^{-1}$), the first predetermined threshold value S1 is between −50% N2i·s$^{-1}$ and −100% N2i·s$^{-1}$.

4. The method according to claim 2
wherein the current derivative $$\left(\frac{dN2i}{dt}\right)$$

is expressed as a percentage of the current value (N2i) per second (% N2i·s$^{-1}$), the second predetermined threshold value (S2) is between +50% N2i·s$^{-1}$ and +200% N2i·s$^{-1}$.

5. The method according to claim 2 wherein the first intermediate time period (T1) is less than 1 second.

6. The method according to claim 2 wherein the second intermediate time period (T2) is less than 1 second.

7. The method according to claim 1 wherein the gas generator comprises a rotating assembly that rotates about the longitudinal axis at a speed of rotation (N1) of the rotating assembly, the method comprises a step comprising measuring a current value (N1i) of the speed of rotation (N1) reached by the gas generator.

8. The method according to claim 7 wherein the stopping step is conditioned by a current value (N1i) of the speed of rotation (N1) greater than a third predetermined threshold value (S3).

9. The method according to claim 1 wherein the method includes a step comprising measuring a current value (Tqi) of an engine torque (Tq) transmitted to the at least one power shaft.

10. The method according to claim 9 wherein the stopping step is conditioned by a current value (Tqi) of the engine torque (Tq) greater than a fourth predetermined threshold value (S4).

11. The method according to claim 1 wherein the method comprises a step of processing the current derivative $$\left(\frac{dN2i}{dt}\right),$$

the processing step enabling filtering the current derivative $$\left(\frac{dN2i}{dt}\right)$$

and/or calculating an average value of the current derivative $$\left(\frac{dN2i}{dt}\right).$$

12. An overspeed safety system for an engine of a rotorcraft, the engine comprising a gas generator and a power assembly, the power assembly comprising at least one power turbine rotated by gases originating from the gas generator, the power assembly comprising at least one power shaft rotationally secured to the power turbine, the power assembly rotating about a longitudinal axis at a speed of rotation (N2), the overspeed safety system comprising:
 a speed sensor for measuring a current value (N2i) of the speed of rotation (N2) reached by the power assembly during a predetermined time period T;
 a shut-down system for stopping operation of the engine; and
 a processing unit connected to both the speed sensor and the shutdown system,
 wherein the processing unit is configured to implement a method comprising:
 measuring a current value (N2i) of the speed of rotation reached by the power assembly during a predetermined time period (T);
 determining a current derivative $$\left(\frac{dN2i}{dt}\right)$$

by determining a time derivative of the current value of the speed of rotation; and
 automatically stopping the engine when the current derivative $$\left(\frac{dN2i}{dt}\right)$$

changes sign over the predetermined time period (T) from a strictly negative value to a strictly positive value.

13. A rotorcraft comprising at least one engine and an overspeed safety system for the at least one engine wherein the safety system is according to claim 12.

14. The method according to claim 2 wherein the first intermediate time period (T1) is between 100 milliseconds and 800 milliseconds.

15. The method according to claim 2 wherein the second intermediate time period (T2) is between 100 milliseconds and 800 milliseconds.

16. A method for stopping an engine of a rotorcraft in overspeed, the rotorcraft comprising at least one engine, the engine comprising a gas generator and a power assembly, the power assembly comprising at least one power turbine rotated by gases originating from the gas generator, the power assembly comprising at least one power shaft rotationally secured to the power turbine, the power assembly rotating about a longitudinal axis at a speed of rotation (N2);
 wherein, during a flight, the method consisting of:
 measuring a current value (N2i) of the speed of rotation reached by the power assembly during a predetermined time period (T);
 determining a current derivative $$\left(\frac{dN2i}{dt}\right)$$

by determining a time derivative of the current value of the speed of rotation; and
 automatically stopping the engine when the current derivative $$\left(\frac{dN2i}{dt}\right)$$

changes sign over the predetermined time period (T) from a strictly negative value to a strictly positive value.

17. The method according to claim 16 wherein the stopping step is implemented when the current derivative $$\left(\frac{dN2i}{dt}\right)$$

is less than or equal to a first predetermined threshold value (S1) during a first intermediate time period (T1) and the current derivative $$\left(\frac{dN2i}{dt}\right)$$

is then greater than or equal to a second predetermined threshold value (S2) during a second intermediate time period (T2).

18. The method according to claim 17 wherein the current derivative $$\left(\frac{dN2i}{dt}\right)$$

being expressed as a percentage of the current value N2i per second (% N2i·s$^{-1}$), the first predetermined threshold value S1 is between $-50\%$ N2i·s$^{-1}$ and $-100\%$ N2i·s$^{-1}$.

19. The method according to claim 17 wherein the current derivative $$\left(\frac{dN2i}{dt}\right)$$

is expressed as a percentage of the current value (N2i) per second (% N2i·s$^{-1}$), the second predetermined threshold value (S2) is between $+50\%$ N2i·s$^{-1}$ and $+200\%$ N2i·s$^{-1}$.

20. The method according to claim 16 wherein the first intermediate time period (T1) is less than 1 second and the second intermediate time period (T2) is less than 1 second.

\* \* \* \* \*